US011161992B2

(12) United States Patent
Holzinger et al.

(10) Patent No.: US 11,161,992 B2
(45) Date of Patent: Nov. 2, 2021

(54) LAMINATE INK

(71) Applicant: TIGER COATINGS GMBH & CO. KG, Wels (AT)

(72) Inventors: Dieter Holzinger, Wels (AT); Peter Eder, Wels (AT); Erikarmen Cajide-Camina, Wels (AT)

(73) Assignee: TIGER COATINGS GMBH & CO. KG, Wels (AT)

( * ) Notice: Subject to any disclaimer, the term of this patent is extended or adjusted under 35 U.S.C. 154(b) by 104 days.

(21) Appl. No.: 16/494,410

(22) PCT Filed: Mar. 16, 2018

(86) PCT No.: PCT/EP2018/056616
§ 371 (c)(1),
(2) Date: Sep. 16, 2019

(87) PCT Pub. No.: WO2018/167250
PCT Pub. Date: Sep. 20, 2018

(65) Prior Publication Data
US 2020/0087525 A1   Mar. 19, 2020

(30) Foreign Application Priority Data

Mar. 17, 2017  (EP) ..................................... 17161572

(51) Int. Cl.
  *C09D 11/101* (2014.01)
  *C09D 11/033* (2014.01)
  *C09D 11/107* (2014.01)
  *C09D 11/36* (2014.01)
  *C09D 11/38* (2014.01)

(52) U.S. Cl.
  CPC .......... *C09D 11/101* (2013.01); *C09D 11/033* (2013.01); *C09D 11/107* (2013.01); *C09D 11/36* (2013.01); *C09D 11/38* (2013.01)

(58) Field of Classification Search
  CPC ....... C09D 11/00; C09D 11/033; C09D 11/10; C09D 11/101; C09D 11/104; C09D 11/107; C09D 11/36; C09D 11/38
  USPC .............................................. 522/77; 523/160
  See application file for complete search history.

(56) References Cited

U.S. PATENT DOCUMENTS

| | | | | |
|---|---|---|---|---|
| 3,919,150 A * | 11/1975 | Kiel, deceased | ....... | C03C 17/32 524/487 |
| 4,278,783 A * | 7/1981 | Taniyama | ............... | C08G 77/08 106/287.11 |
| 4,518,730 A * | 5/1985 | Gastaldo | ................ | C08G 65/22 524/114 |
| 5,221,560 A * | 6/1993 | Perkins | ..................... | C09D 4/00 427/515 |
| 5,385,955 A * | 1/1995 | Tarshiani | ................ | G02B 1/111 522/31 |
| 5,466,727 A * | 11/1995 | Hsieh | .................... | C09D 183/08 523/421 |
| 6,114,406 A | 9/2000 | Caiger et al. | | |
| 6,780,232 B2 * | 8/2004 | Treadway | ............ | C09D 163/00 106/287.12 |
| 7,732,006 B2 * | 6/2010 | Alberto de Rojas | .... | G02B 1/14 427/162 |
| 7,786,209 B2 * | 8/2010 | Carlini | ...................... | C07F 7/21 524/588 |
| 8,642,673 B2 | 2/2014 | Spyrou | | |
| 8,840,986 B2 * | 9/2014 | Kunzel | ................. | C09D 11/033 428/212 |
| 9,856,394 B2 * | 1/2018 | Litman | ...................... | C08J 7/06 |
| 10,865,327 B2 * | 12/2020 | Treadway | ................ | C09D 5/00 |
| 2002/0193479 A1 * | 12/2002 | Treadway | ................ | C09D 4/06 524/261 |
| 2005/0059760 A1 | 3/2005 | Dellwo et al. | | |

(Continued)

FOREIGN PATENT DOCUMENTS

EP     1277810        1/2003
JP     2011001538     1/2011
(Continued)

OTHER PUBLICATIONS

International Search Report and Written Opinion Issued in Corresponding PCT Application No. PCT/EP2018/056616, dated May 22, 2018 (English Translation of International Search Report).

(Continued)

*Primary Examiner* — Sanza L. McClendon
(74) *Attorney, Agent, or Firm* — Norton Rose Fulbright US LLP

(57) ABSTRACT

The invention relates to a multi-stage curing ink comprising compounds for forming at least one organic matrix, which is cured via radical polymerisation and which curing can be initiated by radiation, and comprising alkoxysilane in a quantity of 10 to 60 wt. %, preferably 20 to 50 wt. %, in relation to the total formulation, in order to form at least one inorganic matrix, which is cured via non-radical polymerisation and which curing can be initiated thermally, the ink also including a structure-reinforcing polymer having a number average molecular mass (Mn) of greater than 3000 g/mol, preferably greater than 10,000 g/mol, and particularly preferably greater than 30,000 g/mol, and the viscosity of the ink at 50° C. is in the region of 6 to 15 mPa·s, particularly preferably in the region of 9 to 11 mPa·s, measured with a Brookfield rheometer using a UL adapter with a rotational speed of 50 rotations per minute.

20 Claims, No Drawings

(56) References Cited

U.S. PATENT DOCUMENTS

| | | | |
|---|---|---|---|
| 2006/0158747 A1* | 7/2006 | Kato | G02B 1/041 359/741 |
| 2009/0250218 A1 | 10/2009 | Akarsu et al. | |
| 2010/0227942 A1 | 9/2010 | Spyrou et al. | |
| 2011/0064923 A1 | 3/2011 | Grant et al. | |
| 2012/0062669 A1 | 3/2012 | Keoshkerian et al. | |

FOREIGN PATENT DOCUMENTS

| | | |
|---|---|---|
| JP | 2011/026496 | 2/2011 |
| JP | 2011522931 | 8/2011 |
| JP | 2012046702 | 3/2012 |
| JP | 2012062470 | 3/2012 |
| JP | 2014172971 | 9/2014 |
| JP | 2015218218 | 12/2015 |
| JP | 2016065200 | 4/2016 |
| WO | WO 1997/049774 | 12/1997 |
| WO | WO 2002/061001 | 8/2002 |
| WO | WO 2003/077033 | 9/2003 |
| WO | WO 2012/121700 | 9/2012 |
| WO | WO 2013/146706 | 10/2013 |
| WO | WO 2015/140682 | 9/2015 |
| WO | WO 2017/009097 | 1/2017 |

OTHER PUBLICATIONS

Office Action issued in Corresponding Japanese Application No. 2019551283, dated Sep. 1, 2020 (English Translation provided).
Office Action issued in Corresponding Chinese Application No. 201880018786.6, dated Jul. 29, 2021 (English Translation provided).

* cited by examiner

LAMINATE INK

CROSS-REFERENCE TO RELATED APPLICATIONS

This application is a national phase application under 35 U.S.C. § 371 of International Application No. PCT/EP2018/056616, filed Mar. 16, 2018, which claims priority to and the benefit of European Patent Application No. 17161572.7, filed Mar. 17, 2017. The contents of the referenced patent applications are incorporated into the present application by reference.

FIELD OF THE INVENTION

The invention relates to a multi-stage curing ink for inkjet printers for forming vinyl films, which ink comprises compounds for forming at least one organic matrix which is cured via radical polymerisation and which curing can be initiated by radiation, and compounds for forming at least one inorganic matrix which is cured via non-radical polymerisation and which curing can be initiated thermally. Such inks can be used for producing luxury vinyl tiles (LVTs) or for printing paper or HDF boards and subsequent pressing with melamine overlay. The expression "curing initiated by radiation" shall be understood in the sense of the present invention to mean curable by UV, UV-LED or electron radiation.

BACKGROUND

LVTs consist of at least two vinyl- or polyester-based films which are laminated with one another at temperatures above 100° C. and under pressure. One of the films serves as a base film for decoration, whereas the second film is a transparent, abrasion-resistant layer. LVTs have many positive properties: the surface is sealed and resistant to impacts and abrasion. It can be provided with various structures and also withstands high temperatures temporarily (for example caused by cigarette burns and hot pan bottoms) without sustaining damage. The surface is easily looked after and cleaned, is heat- and light-resistant, is odourless, and insensitive to alcohol or organic solvents as well as the action of steam and water. The primary use of LVTs lies in interior floor finishing. LVTs are becoming increasingly attractive due to near-natural designs, such as wood, stone and metal layouts, but also fictitious layouts. Compared to conventional laminate floorings, LVTs have different advantages: whereas laminate floorings provide a very hard underfoot feeling due to the provided melamine surface, LVTs provide a much softer and more pleasant underfoot feeling due to the provided abrasion films (a few millimetres thick), and this has proven to be more popular both in the private and public sectors.

Structured LVTs are produced by decorating the base film, usually by means of similar printing methods. To this end, appropriate films are printed in accordance with the prior art inter alia by means of rotogravure printing or sometimes also by means of inkjet printing, wherein primary solvent-based or aqueous inks are used. In a subsequent process step the decorated films are laminated with a transparent film, wherein good intermediate-layer adhesion is sought. In the case of inks that are not optimally suitable, adhesive systems are often used in order to attain a greater sound resistance.

The production of the corresponding printing cylinders is very complex and therefore can be justified only with high quantities of the decorations in question.

Laminate floorings or kitchen worktops usually consist of an MDF or HDF base plate which subsequently is pressed with a printed paper, sometimes with use of additional paper layers, with use of a melamine-based overlay. A liquid impregnation with melamine- and/or urea-based resin solutions also constitutes a possible step for further processing. The pressing is performed either in what are known as high-speed presses, in double-belt presses or in multi-level presses. The majority of the laminates produced nowadays are produced with use of similar printing methods.

In order to carry out printing with low print numbers, digital inkjet printing onto various substrates has more recently succeeded in achieving an established market position. A printhead is controlled in accordance with an electronic template and delivers the image after a single pass or multi pass of the material to be printed.

Radiation-curable inks for inkjet printing are known. Their advantage lies in the fact that the print is fixed immediately after its application, which, especially on non-absorbable substrates, such as a vinyl film, has the advantage that the applied colours cannot diffuse into one another, whereby prints having maximum colour brilliance and sharpness of detail are made possible.

U.S. Pat. No. 8,642,673 B2 discloses the curing of a mixture of polyester acrylate, the radiation-curing product Dynapol R110, an acrylate monomer, a photoinitiator, a pigment and Dynasylan Glymo by irradiation, and the thermal treatment of the radically polymerised coating in order to complete the reaction of the alkoxysilane groups is also disclosed. The described composition relates to an anti-corrosion coating, and it is also not possible to determine the number-average molecular mass (Mn) of Dynapol R110. According to US 2010/0227942 it must be assumed that the mean molecular mass of Dynapol R110 is between 5000 and 6000 g/mol.

Compositions for UV-curable inks are disclosed for example in WO 02/061001 A1. The formulations contain at least one multifunctional (meth)acrylate monomer, at least one α,β-unsaturated ether, at least one photoinitiator, and at least one pigment and have a viscosity of less than 100 mPas at 25° C.

U.S. Pat. No. 6,114,406 discloses UV-curable inkjet inks based on polyfunctional alkoxyated and/or polyfunctional polyalkoxylated acrylate monomers, a photoinitiator and a colouring substance, preferably pigment. The formulations can optionally also comprise smaller amounts of non-alkoxylated monomers, which also optionally can be monofunctional. In addition, surfactants, wetting aids and pigment stabilisers can optionally be used. The disclosed compositions are substantially or entirely free from solvents and have a low toxicological profile.

It has now been found, however, that the available radiation-curable inks for creating vinyl film are less suitable for the production of LVTs and melamine-based products. The reasons for this lie primarily in the inner strength of the cured ink layers, which is too low, and also in the impact resistance, which likewise is too low, but also in the non-disclosed compatibility with the carrier layer and the transparent abrasion film to be laminated. A further problem is posed by the partly poor adhesion values in particular for the laminated transparent abrasion film. In order to avoid the problem of inadequate intermediate-layer adhesion, the use of an adhesive system for fixing the abrasion film on the base film is described for example in WO 2015/140682 A. A disadvantage of the described process is that the use and the application of adhesive system constitutes an additional process step which is associated with an increased cost of the process.

The use of solvent-based systems for decorating LVTs forms part of the prior art. Possible compositions for solvent-based inks are disclosed for example in US 2011/0064923 A1, JP 2011026496 A and in WO 2012/121700 A1. However, the emission quantities of VOC (volatile organic compounds) caused by the high solvent fraction, which on the one hand are harmful to the environment and have to be filtered and disposed of at high cost and on the other hand necessitate the use of explosion-proof equipment, have proven here to be disadvantageous.

Aqueous inks are also used for this purpose, wherein however the disadvantages are just as serious. Compositions for water-based inks are disclosed for example in WO 97/049774 A2. The formulations contain water-soluble organic solvents, such as polyhydric alcohols and nitrogen-containing cyclic substances, such as 2-pyrrolidinone, in order to improve the anti-clogging properties of the inks. The use of 2-pyrrolidone and/or derivatives thereof and polyhydric alcohols in fixed concentration ranges in an aqueous inkjet ink is disclosed for example in EP 1 277 810 B1. The vinyl films to be printed are very thin and thus thermally sensitive, and therefore the contained amounts of water and glycols can be removed only very slowly in order to prevent thermal damage to the film. This then leads to a significantly reduced image quality, since the aqueous ink drops run into one another and subsequently make the image blurred. The use of this ink type on decorative paper causes the paper to swell, which has a negative effect on the sharpness of the image and the registration in the printing process.

DETAILED DESCRIPTION OF THE INVENTION

There is thus a need for UV-curable inks for inkjet printing for the printing and lamination of LVTs and melamine-based products which overcome the above-mentioned inadequacies of the known UV-curable, aqueous and solvent-based inks and at the same time can act as an adhesion bridge for the lamination with a further film made of vinyl or polyester or a melamine-based overlay and do not weaken the structural integrity of the composite.

It has surprisingly been found that laminatable multi-stage curing inks comprising compounds for forming at least one organic matrix, which is cured via radical polymerisation and which curing can be initiated by radiation, and alkoxysilanes preferably in a quantity of 10 to 60% by weight, more preferably 20 to 50% by weight, in relation to the total formulation, in order to form at least one inorganic matrix, which is cured via non-radical polymerisation and which curing can be initiated thermally, for inkjet printing allow the lamination of the printed images between two vinyl or polyester films or pressing with a melamine-based overlay if the ink contains a structure-reinforcing polymer having a number-average molecular mass (Mn) of greater than 3000 g/mol, preferably greater than 10,000 g/mol, and particularly preferably greater than 30,000 g/mol and the viscosity of the ink at 50° C. is in the range of 6 to 15 mPa·s, particularly preferably in the range of 9 to 11 mPa·s. Such inks act as an adhesion bridge between the films and improve their cohesion. It is alleged that the inorganic matrix not yet cured as a result of the first curing initiated by radiation migrates towards the films and possibly into the films and then leads, as a result of the subsequent second thermally initiated curing, to an intensified bonding between the films. In accordance with the present invention the non-radical polymerisation of the inorganic matrix it is also understood to mean a polycondensation or other mechanisms, known to a person skilled in the art, for forming chains from monomers, oligomers and polymers. In the inks according to the invention the compounds for forming the at least one inorganic matrix are alkoxysilanes and are subjected during the lamination to a thermally induced hydrolysis and condensation, whereby, in addition to the organic polymer network already formed by the radiation-induced curing, a second inorganic network based on Si—O—Si bonds is also formed. This second network reinforces the provided structure and ensures a chemical bonding of the two films in the lamination phase.

The structure-reinforcing polymer used in accordance with the invention is preferably soluble in the ink and/or at the time of the matrix formation does not react with the matrix formers contained in the ink. In this way the structure-reinforcing polymer is not covalently bonded to the network created by the radical polymerisation, whereby the properties of the polymer are retained. Possible polymers for use as structure reinforcers in the ink according to the invention are, for example, polyesters, polyurethanes, polyacrylates and polyamides.

In accordance with a further preferred embodiment of the present invention the ink contains less than 2% by weight water, preferably less than 1.0% by weight water, and particularly preferably less than 0.1% by weight water, in each case in relation to the total formulation.

It is also favourable if the structure-reinforcing polymer of the ink is a polyester. Such a structure-reinforcing polyester used in accordance with the invention preferably has a glass transition range from −10° C. to 20° C., wherein the polyester can be both an amorphous and a semi-crystalline polyester. The tensile strength of the used polyester is preferably at least 30 psi, more preferably greater than 500 psi, and even more preferably more than 1000 psi. The melt flow index of the corresponding polyester is preferably between 90° C. and 130° C. and should not exceed 150° C.

In addition, in the ink according to the invention the compounds for forming the at least one organic matrix are preferably selected from acrylate and/or methacrylate and/or vinyl acrylate monomers or acrylate and/or methacrylate and/or vinyl acrylate oligomers, and mixtures hereof. Dyes and photoinitiators can optionally also be provided, wherein the latter are compulsory only in the case of UV-curable inks. The inks can optionally contain further additives such as pigment stabilisers, HALS compounds and UV stabilisers.

In accordance with a further preferred embodiment monofunctional or polyfunctional, vinyl-based components are also contained in the ink according to the invention, preferably in a concentration range from 3 to 60% by weight, particularly preferably from 7 to 40% by weight. Components of this kind provide the films with good adhesion properties due to the chemical similarity to the film material of the LVTs and melamine-based products of the ink according to the invention. However, also suitable components, such as compounds containing melamine groups, are also possible within the scope of the invention.

It is furthermore preferred if, in the inks according to the invention, the compounds for forming the at least one organic matrix are selected from acrylate and/or methacrylate and/or vinyl acrylate monomers or acrylate and/or methacrylate and/or vinyl acrylate oligomers, and mixtures hereof. Alkoxysilanes form the second, inorganic network based on Si—O—Si bonds, which network reinforces the provided structure and ensures a chemical bonding of the two films in the lamination phase. This second curing mechanism, which preferably takes place at a temperature between 110° C. and 190° C., preferably between 130° C. and 170° C., leads to a significant increase in the glass transition temperature of the ink after curing of the organic matrix/matrices to between −20° C. and 0° C., or after curing of the organic and inorganic matrices to between 0° C. and 30° C. This increase in the glass transition temperature also leads to an increase of the shear strength of LVTs and melamine-based products produced with use of the ink according to the invention. This second curing step is preferably performed at a temperature below the boiling point of the used silanes.

Due to the combination of the described components in a multi-stage curing ink, which forms at least one organic matrix and at least one inorganic matrix during the curing, the disadvantages of the currently available prior art presented above can be overcome.

The inks according to the invention contain the structure-reinforcing polymer or preferably the structure-reinforcing polyester, preferably in a range of 2 to 20% by weight, preferably in an amount of 4 to 10% by weight. It has been found that if the above-mentioned quantities are observed the LVTs and melamine-based products, produced with use of the ink according to the invention, have the best shear strength values.

In accordance with a further preferred embodiment of the present invention the ink according to the invention contains, in addition to acrylates for forming the at least one organic matrix, also a. 10 to 40% by weight of an alkoxysilane for forming the at least one inorganic matrix, b. 4 to 30% by weight of a structure-reinforcing polymer which is not incorporated into the matrices, and c. 5 to 20% by weight of vinyl compounds for incorporation into the organic matrix.

Here as well it has been found that by combining the specified components whilst observing the stated quantities, the LVTs and melamine-based products produced with use of the ink according to the invention have excellent shear strength values. Usable acrylates for inkjet printers for forming the at least one organic matrix are specified further below by way of example.

In addition, blocked isocyanate curing agents which can crosslink the hydroxyl groups contained in structure-reinforcing polymers or polyesters can be contained in the inks according to the invention. The reversibly blocked isocyanate curing agents to be used optionally in the formulations according to the invention are preferably aliphatic isocyanates. Particularly preferred are curing agents which are liquid at room temperature. Examples of suitable curing agents are Desmodur® BL 3175, Desmodur® BL 3370 MPA or Desmodur® BL 3475 BA/SN (all BAYER) or Vestanat® B 1358 A or Vestanat® B 1370 (EVONIK).

The structure-reinforcing polyester to be used in accordance with the invention can be, for example, Vittel V3200B, V3300B, V3350B, V3550B, KP7915, KP7962 from the company Bostik.

When choosing the structure-reinforcing polymer or polyester and proportion thereof in the formulation the viscosity of the resultant ink must be taken into consideration. The viscosity of the inks according to the invention, as already mentioned, lie at processing temperature—here 50° C., these temperatures usually lying from approximately 45° C. to 60° C.—in the range of 6 to 15 mPa·s, particularly preferably in the range of 9 to 11 mPa·s. It is true that components with low functionality tend to result in a lower viscosity of the ink, whereas components with a high functionality tend to result in a higher viscosity of the ink. The viscosity of the ink according to the invention was measured using a UL adapter with a rotary speed of 50 revolutions per minute, in each case at processing temperature (i.e. printing temperature, here 50° C.).

The vinyl-based monomers used in accordance with the invention can be selected for example from the following compounds: N-vinyl-pyrrolidone, N-vinyl-caprolactam, N-vinyl-imidazole, N-vinyl-N-methyl acetamide, ethyl vinyl ether, n-butyl vinyl ether, iso-butyl vinyl ether, tert.-butyl vinyl ether, cyclohexyl vinyl ether, 2-ethylhexyl vinyl ether, dodecyl vinyl ether, octadecyl vinyl ether, 1,4-butanediol divinyl ether, diethylene glycol divinyl ether, triethylene glycol divinyl ether, 1,4-cyclohexane dimethanol divinyl ether, hydroxybutyl vinyl ether, 1,4-cyclohexane dimethanol monovinyl ether, 1,2,4-trivinyl cyclohexane, vinyl phosphonic acid and vinyl phosphonic acid dimethyl ester, etc.

The alkoxysilanes to be used in accordance with the invention can be selected for example from the following compounds: N-(2-aminoethyl)-3-aminopropyltrimethoxysilane, N-cyclohexyl-3-aminopropyltrimethoxysilane, N-cyclohexylaminomethyltriethoxysilane, 3-aminopropyltriethoxysilane, 3-(2-aminomethylamino)-propyltriethoxysilane, N-(2-aminoethyl)-3-aminopropylmethyldimethoxysilane, 3-aminopropyltrimethoxysilane, 3-ureidopropyltri-methoxysilane, N-methyl[3-(trimethoxysilyl)-propyl]carbamate, N-trimethoxysilylmethyl-O-methylcarbamate, N-dimethoxy (methyl)silylmethyl-O-methylcarbamate, tris-[3-(trimethoxysilyl)-propyl]-isocyanurate, 3-glycidoxypropyltrimethoxysilane, 3-glycidoxypropyltriethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane, (cyclohexyl)-methyldimethoxysilane, dicyclopentyldimethoxysilane, phenyltriethoxysilane, triacetoxyethylsilane, 1,2-bis(triethoxysilyl)ethane, etc. Silanes which have a boiling point above the lamination temperature are preferably used if such a lamination is performed.

Within the scope of the invention monofunctional to oligofunctional compounds can be used as the acrylate and methacrylate monomers.

Examples of monofunctional (meth)acrylic esters are: lauryl acrylate, isodecyl acrylate, tridecyl acrylate, tetrahydrofurfuryl acrylate (THFA), 2-(2-ethoxyethoxy)ethyl acrylate (EOEOEA), cyclic trimethylolpropane formal acrylate (CTFA), isobornyl acrylate (IB OA), C12-C14 alkylmethacrylate, tetrahydrofurfuryl methacrylate (THFMA), polypropylene glycol monomethacrylate and isobornyl methacrylate. The difunctional (eth)acrylic esters to be used are, for example, ethoxylated bisphenol-A-diacrylate, 1,6-hexandioldiacrylate (HDDA), polyethylene glycol-200-diacrylate (PEG200DA), tetraethylene glycol diacrylate (TTEGDA), triethylene glycol diacrylate (TEGDA), propoxylated neopentyl glycol diacrylate, ester diol diacrylate, tripropylene glycol diacrylate (TPGDA, ethoxylated bisphenol-A-diacrylate, dipropylene glycol diacrylate (DPGDA), alkxoylated 1,6-hexanediol diacrylate, ethoxylated bisphenol-A-diacrylate, triethylene glycol dimethacrylate (TIEGDMA), ethylene glycol dimethacrylate (EGDMA), tetraethylene glycol dimethacrylate (TTEGDMA), 1,4-butanediol dimethacrylate (BDDMA), diethylene glycol dimethacrylate (DEGDMA), 1,6-hexanediol dimethacrylate (HDDMA), 1,3-butylene glycol dimethacrylate (BGDMA), ethoxylated bisphenol-A-dimethacrylate and tricyclodecane dimethanol dimethacrylate. Usable (meth)acrylic esters of functionality 3 or above are, for example, ethoxylated trimethylolpropane triacrylate, pentaerythritol tetraacrylate (PETTA), trimethylolpropane triacrylate (TMPTA), ditrimethylolpropane tetraacrylate (DiTMPTTA), tris(2-hydroxyethyl)isocyanurate triacrylate, dipentaerythritol pentaacrylate (DiPEPA), dipentaerythritol hexaacrylate (DiPEHA), ethoxylated trimethylolpropane triacrylate, pentaerythritol triacrylate, ethoxylated trimethylolpropane triacrylate, propoxylated trimethylolpropane triacrylate, ethoxylated pentaerythritol tetraacrylate (PPTTA), ethoxylated trimethylolpropane triacrylate and trimethylolpropane trimethacrylate (TMPTMA).

Besides the monomers listed here, there are also numerous further acrylates of similar structure. They can be found in the product overviews of numerous manufacturers, such as Sartomer/Arkema, BASF or Rahn, which are known to those skilled in the art.

In addition, polymerisable oligomers can also be co-employed. These include epoxy acrylates, aliphatic and aromatic urethane acrylates, polyester acrylates and unbranched acrylate oligomers.

Suitable pigments within the scope of the invention can be of organic or inorganic nature. Suitable inorganic pigments include, for example, titanium dioxide of various spinels and metal oxides, and carbon black, whereas suitable organic pigments include, for example, the classes of phthalocyanines, anthraquinones, perylenes, carbazoles, monoazo- and bisazo-benzimidazolones, isoindolinones, monoazonaphtholes, quinacridones, diazopyranthrones, pyrazolones and pyranthrones.

Examples of commercially available organic and inorganic pigments are listed in the Colour Index, Volumes 1 to 8, of the Society of Dyers and Colourists, Yorkshire, England, such as Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24, Pigment Blue 60, Pigment Brown 5, Pigment Brown 23, Pigment Brown 25, Pigment Yellow 3, Pigment Yellow 14, Pigment Yellow 16, Pigment Yellow 17, Pigment Yellow 24, Pigment Yellow 65, Pigment Yellow 73, Pigment Yellow 74 Pigment Yellow 83, Pigment Yellow 95, Pigment Yellow 97, Pigment Yellow 108, Pigment Yellow 109, Pigment Yellow 110, Pigment Yellow 113, Pigment Yellow 128, Pigment Yellow 129, Pigment Yellow 138, Pigment Yellow 139, Pigment Yellow 150, Pigment Yellow 154, Pigment Yellow 156, Pigment Yellow 175, Pigment Green 1, Pigment Green 7, Pigment Green 10, Pigment Green 36, Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60, Pigment Orange 61, Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207, Pigment Red 224, Pigment Violet 19, Pigment Violet 23, Pigment Violet 32, Pigment Violet 37, Pigment Violet 42, Pigment Black 6 and Pigment Black 7.

Besides pigments, dyes can also be used in the inks as colour-giving component. Dyes which can be used in the formulations according to the invention will be specified hereinafter, wherein, in addition to the types listed here, numerous further types of similar structure are commercially available. These can be found in the product overviews of numerous manufacturers, such as BASF, Clariant or Keystone, which are known to those skilled in the art. The following types are mentioned by way of example: Orasol® Black X45, Orasol® Black X51, Orasol® Black X55, Orasol® Blue 825, Orasol® Blue 855, Orasol® Brown 324, Orasol® Brown 326, Orasol® Orange 245, Orasol® Orange 247, Orasol® Orange 251, Orasol® Orange 272, Orasol® Pink 478, Orasol® Red 330, Orasol® Red 335, Orasol® Red 355, Orasol® Red 363, Orasol® Red 365, Orasol® Red 385, Orasol® Red 395, Orasol® Red 471, Orasol® Yellow 081, Orasol® Yellow 141, Orasol® Yellow 152, Orasol® Yellow 157, Orasol® Yellow 190, Savinyl® Yellow 2GLS, Savinyl Black RLSN, Savinyl Blue GLS, Savinyl Feuerrot GLS, Savinyl Fire Red 3GLS.

Whereas the dyes can be at least partially dissolved in the ink base, the pigments are usually introduced into the formulations through milling into selected reactive monomers and/or oligomers. Adding dispersing and wetting aids often aids in improving the milling efficiency and stabilising the pigments de-agglomerated by the milling process. Suitable additives of this kind are available for example under the trade names SOLSPERSE® (The Lubrizol Corporation), EFKA® (Ciba Specialty Chemicals) and BYK (Byk Chemie). The amount of dispersing aid added is determined by the type and amount of the pigment used and amounts to approximately 20 to 100% for organic pigments and to approximately 5 to 80% for inorganic pigments, each in relation to the amount of the pigment.

If the organic compounds of the inks according to the invention are to be cured by UV radiation to form an organic matrix, photoinitiators should preferably also be added to the inks. Particularly preferred photoinitiators include, among others, those of the classes of acylphosphinoxides and acylphosphonates, and well-suited representatives are, for example, bis(2,4,6-trimethylbenzoyl)-phenylphosphinoxide, bis-(2,6-dimethoxybenzoyl)-2,4,4-trimethyl-pentylphosphinoxide, and further 1-hydroxycyclohexyl phenyl ketone, 2-methyl-1-[4-(methylthio)-phenyl]-2-morpholino-propen-1-one and 2-hydroxy-2-methyl-1-phenylpropan-1-one. These compounds are available, for example, under the trade names Irgacure® (BASF) or Speedcure® (Lambson). Furthermore, various modifications of alpha-hydroxy ketones, benzophenylene and alpha-amino ketones can be used.

Co-initiators and amine synergists may be used to improve the curing rate, and examples include isopropyl thioxanthone, ethyl-4-(dimethylamino) benzoate and dimethylaminoethyl methacrylate.

Particularly preferred are polymeric versions of the class 1 and 2 photoinitiators and synergists mentioned above. These are supplied, for example, by the companies Rahn, Lambson and BASF.

The preferred quantities to be added are within a range of 1 to 12, particularly preferably within a range of 2 to 8% by weight, in relation to the total weight of the formulation. The selection of the photoinitiator, too, strongly depends on the type and amount of the pigment employed; advantageously, the pigment(s) and photoinitiator(s) do not absorb at the same wavelength. Besides molecular photoinitiators, polymeric photoinitiators can also be used, for example from the company Lambson under the name SPPEDCURE®. In addition self-initiating acrylates sold by the company Allnex within the product line LEO® can be used.

Furthermore, thermal stabilisers may find use as additives. These prevent the polymerisable inkjet inks from auto-polymerising by trapping the radicals which have developed by a thermally initiated decay of the photoinitiators, and thus increase the storage stability of said inks. These products are sold by different commercial suppliers under various trade names, such as Irgafos®, Irganox®, Irgastab®, Chimassorb®, Tinuvin®, Uvinul®, Hycite®. The preferred quantity of these compounds to be added ranges from below 1% by weight, preferably below 0.5% by weight.

As a further class of additives, materials with a UV-absorbing effect can be used. In addition to substances that are not incorporated into the polymer matrix, such as various TINUVIN® types from the company BASF, UV absorbers with a polymerizable group which cannot migrate by the incorporation into the polymer network can also be used. Such products are marketed for example by the company Otsuka under the name RUVA 93. Furthermore, what are known as HALS additives can be used, which for example are sold likewise under the name TINUVIN® by the company BASF.

The formulations according to the invention are produced by bringing together the various components by mixing, stirring, milling and other methods which are suitable for producing homogeneous compositions.

The final formulations may subsequently be applied via inkjet printer, not only in multi-pass but especially in the single-pass method, and then cross-linked by UV or electron radiation.

The invention will also be explained by the following examples, without reducing it to the scope of the examples. To a person skilled in the art it is easy to modify the examples within the scope of the invention and to adjust them to specific requirements.

The employed mill base was composed of the following constituents: 25% pigment (for example Pigment Blue 15:3), 3% Tegodisperse, 72% CTFA. The milling of the base was carried out with a ball mill until the desired particle diameter was reached.

In the following Tables 1 and 2 the ink constituents are listed on the left from top to bottom and the individual experimental batches are given in the header row. The quantities are given in % by weight, in relation to the total formulation.

TABLE 1

Overview of the tested formulations:

| | V1 | V2 | V3 | V4 | IJ1 | IJ2 | IJ3 | IJ4 | IJ5 | IJ6 | IJ7 | IJ8 | IJ9 |
|---|---|---|---|---|---|---|---|---|---|---|---|---|---|
| Speedcure 84 | 1.0 | 1.0 | 1.0 | 1.0 | 2 | 3 | 2 | 2 | 3 | 2 | 2 | 1.5 | |
| Speedcure TPO | 3.5 | 3.5 | 3.5 | 3.5 | | | | | | | | | |
| Omnirad 380 | 6.5 | 6.5 | 6.5 | 6.5 | 2 | 4 | 2 | 2 | 2 | 4 | 2 | 1.5 | |
| Sartomer SR531 | 52 | 52 | 52 | 52 | | | | 14 | | | | | 41 |
| Sartomer 420 | | | | | | | | | | | | 41 | |
| Sartomer SR339C | | 4 | | | 13 | 10 | 8 | | 34 | 40 | 40 | | |
| N-vinylcaprolactam | 19 | 19 | 14 | 14 | | | | | | | | 10 | 10 |
| Sartomer SR399LV | 6.5 | | | | | | | | | | | | |
| Sartomer SR351 | 1.5 | | | | | | | | | | | | |
| Vitel 3550B | | 4 | | 3 | 25 | | 20 | | | | | | |
| Vitel 2700B.F | | | 3 | | | 6 | | 9 | 5 | 5 | 5 | | |
| Butanediol vinyl ether | | | | 10 | 30 | 47 | 20 | 30 | 10 | 10 | 10 | | |
| VEEA | | | | | | 9 | 5 | | 6 | 6 | 6 | 5 | 5 |
| K-PURE CXC-1614 | | | | | | | | | | | | | 1 |
| Peroxin HX | | | | | | | | | | | | 1 | |
| Sartomer CN704 | | | | | | | | | | | | 10 | 10 |
| Sartomer SR506D | | | | | | | | | | | | 7 | 7 |
| Sartomer SR508 | | | | | | | | 10 | | | | | |
| Dynasylan GLYMO | | | 10 | | 25 | 11 | 40 | 30 | 28 | 32 | 30 | 15 | 15 |
| RUVA 93 | | | | | | | | | | | 2 | | |
| Mill base blue | 10 | 10 | 10 | 10 | | 10 | | | 10 | | | 8 | 8 |
| Orasol black CN | | | | | 3 | | 3 | 3 | | 3 | 3 | | |
| TOTAL | 100 | 100 | 100 | 100 | 100 | 100 | 100 | 100 | 100 | 100 | 100 | 100 | 100 |

The raw materials listed in Table 1 were mixed; The figures quoted are in parts by weight.

TABLE 2

Explanation of the used raw substances

| | Supplier | CAS number (if provided) | Chem. description |
|---|---|---|---|
| Speedcure 84 | Lambson | 947-19-3 | Type 1 photoinitiator |
| Speedcure TPO | Lambson | 84434-11-7 | Type 1 photoinitiator |
| Omnirad 380 | IGM | 162881-26-7 | Type 1 photoinitiator |
| SR531 | Sartomer/Arkema | 66492-51-1 | Acrylate monomer |
| SR339C | Sartomer/Arkema | 48145-04-6 | Acrylate monomer |
| SR420 | Sartomer/Arkema | 87954-40-3 | Acrylate monomer |
| CN704 | Sartomer/Arkema | — | Structure-reinforcing polymer |
| SR506D | Sartomer/Arkema | 5888-33-5 | Acrylate monomer |
| K-PURE CXC-1614 | KING Industries | — | Super acid generator |
| Peroxan HX | Pergan | 78-63-7 | Peroxide |
| N-vinylcaprolactam | BASF | 2235-00-9 | Vinyl monomer |
| SR399LV | Sartomer/Arkema | 60506-81-2 | Acrylate monomer |
| SR351 | Sartomer/Arkema | 15625-89-5 | Acrylate monomer |
| Vitel 3550B | Bostik/Arkema | — | Structure-reinforcing polymer |
| Vitel 2700B.F | Bostik/Arkema | — | Structure-reinforcing polymer |
| Butanediol vinyl ether | BASF | 3891-33-6 | Vinyl polymer |
| VEEA | Nippon Shukobai | 86273-46-3 | Acrylate/vinyl monomer |
| SR508 | Sartomer/Arkema | 57472-68-1 | Acrylate monomer |
| GLYMO | Evonik | 2530-83-8 | Alkoxy silane |
| RUVA 93 | Otsuka | 96478-09-0 | Reactive UV absorber |
| Mill base blue | TIGER | — | |
| Orasol black CN | BASF | — | Dye |

The inks were then applied to a white LVT base film by means of multi-pass inkjet printing by the company DYSS, the organic matrix was cured by means of UV radiation, and were then laminated with a transparent PVC-based abrasion film at 130° C., 5 bar, for 30 seconds, wherein the inorganic matrix was cured. The results of the performed peel test of the maximally applicable force in N/cm are provided in the following table.

TABLE 3 results of the performed tests:

| Test number | Peel test LVT sample max. force [N/cm] | Cross cut after pressing with melamine overlay on high-speed press | Cross cut after pressing with melamine overlay on double-belt press | Cross cut after pressing with melamine overlay on multi-level press |
|---|---|---|---|---|
| V1 | 1 | Gt5 | Gt5 | Gt5 |
| V2 | 3 | Gt5 | Gt5 | Gt5 |
| V3 | 5 | Gt5 | Gt5 | Gt5 |
| V4 | 5 | Gt5 | Gt5 | Gt5 |
| IJ1 | 25 | Gt0 | Gt0 | Gt0 |
| IJ2 | 18 | Gt0 | Gt0 | Gt0 |
| IJ3 | 20 | Gt0 | Gt0 | Gt0 |
| IJ4 | 19 | Gt0 | Gt0 | Gt0 |
| IJ5 | 15 | Gt0 | Gt0 | Gt0 |
| IJ6 | 25 | Gt0 | Gt0 | Gt0 |
| IJ7 | 24 | Gt0 | Gt0 | Gt0 |
| IJ8 | 30 | Gt0 | Gt0 | Gt0 |
| IJ9 | 30 | Gt0 | Gt0 | Gt0 |

The ink formulations V1-V4 of the comparison samples all demonstrated bonding strengths that were too low in the tests performed. Only by combination of the constituents according to the invention can LVTs and melamine-based products produced with use of the ink according to the invention attain bonding strengths greater than the required 10 N/cm or at a melamine pressing Gt0.

In addition, super acid generators or peroxides can also be added to the ink formulations according to the invention. These accelerate the reaction of the alkoxy groups during the thermal lamination of the films. These substances are sold for example by the companies KING Industries and Pergan.

The invention claimed is:

1. A laminatable, multi-stage curing ink, comprising compounds for forming at least one organic matrix, selected from acrylate and/or methacrylate and/or vinyl acrylate monomers or acrylate and/or methacrylate and/or vinyl acrylate oligomers and mixtures thereof, which is cured by radical polymerisation and which curing can be initiated by radiation, and alkoxysilanes in a quantity of 10 to 60% by weight, in relation to the total formulation for forming at least one inorganic matrix, which is cured by non-radical polymerisation and which curing can be initiated thermally, characterised in that the ink, besides a dispersing aid, also contains a structure-reinforcing polymer having a number-average molecular mass (Mn) of greater than 3000 g/mol and the viscosity of the ink at 50° C. is in the range of 6 to 15 mPa·s, measured with a Brookfield rheometer with use of an UL adapter with a rotational speed of 50 revolutions per minute.

2. The ink according to claim 1, characterised in that it contains alkoxysilanes in a quantity of 20 to 50% by weight, in relation to the total formulation.

3. The ink according to claim 1, characterised in that it contains a structure-reinforcing polymer having a number-average molecular mass (Mn) of greater than 10,000 g/mol.

4. The ink according to claim 1, characterised in that it contains a structure-reinforcing polymer having a number-average molecular mass (Mn) of greater than 30,000 g/mol.

5. The ink according to claim 1, characterised in that and the viscosity of the ink at 50° C. is in the range of 9 to 11 mPa·s, measured with a Brookfield rheometer with use of an UL adapter with a rotational speed of 50 revolutions per minute.

6. The ink according to claim 1, characterised in that the structure-reinforcing polymer is soluble in the ink and/or, when forming the matrix, does not react with the compounds for forming at least one organic matrix, and the alkoxysilanes for forming at least one inorganic matrix contained in the ink.

7. The ink according to claim 1, characterised in that the ink contains less than 2% by weight water in relation to the total formulation.

8. The ink according to claim 7, characterised in that the ink contains less than 1.0% by weight water in relation to the total formulation.

9. The ink according to claim 7, characterised in that the ink contains less than 0.1% by weight water in relation to the total formulation.

10. The ink according to claim 1, characterised in that the structure-reinforcing polymer is selected from polyesters, polyurethanes, polyacrylates and polyamides.

11. The ink according to claim 1, characterised in that the at least one inorganic matrix is formed at 100° C. to 190° C.

12. The ink according to claim 11, characterised in that the at least one inorganic matrix is formed at 130° C. to 170° C.

13. The ink according to claim 11, characterised in that it also contains monofunctional or polyfunctional vinyl-based components.

14. The ink according to claim 11, characterised in that it also contains monofunctional or polyfunctional vinyl-based components in a concentration range of 3 to 60% by weight.

15. The ink according to claim 11, characterised in that it also contains monofunctional or polyfunctional vinyl-based components in a concentration range of 7 to 40% by weight.

16. The ink according to claim 7, characterised in that the glass transition temperature of the ink after curing of the organic matrix/matrices is between −20° C. and 0° C., or after curing of the organic and inorganic matrices is between 0° C. and 30° C.

17. The ink according to claim 1, characterised in that the structure-reinforcing polymer is contained in a range of 2 to 20% by weight.

18. The ink according to claim 17, characterised in that the structure-reinforcing polymer is contained in a range of 4 to 10% by weight.

19. The ink according to claim 1, which ink also contains, in addition to acrylates for forming the at least one organic matrix
   a. 10 to 40% by weight of the alkoxysilane for forming the at least one inorganic matrix,
   b. 4 to 30% by weight of the structure-reinforcing polymer which is not incorporated into the matrices, and
   c. 5 to 20% by weight of the acrylate and/or methacrylate and/or vinyl acrylate monomers or acrylate and/or methacrylate and/or vinyl acrylate oligomers for incorporation into the organic matrix.

20. The ink according to claim 1, characterised in that it also contains blocked isocyanate curing agent.

\* \* \* \* \*